United States Patent [19]

Henschen et al.

[11] Patent Number: 5,032,703
[45] Date of Patent: Jul. 16, 1991

[54] SELF REGULATING TEMPERATURE HEATER CARRIER STRIP

[75] Inventors: Homer E. Henschen, Carlisle; Michael J. McKee, New Cumberland; Joseph M. Pawlikowski, Lancaster, all of Pa.

[73] Assignee: AMP Incorporated, Harrisburg, Pa.

[21] Appl. No.: 277,361

[22] Filed: Nov. 29, 1988

[51] Int. Cl.⁵ ............................................. B23K 1/00
[52] U.S. Cl. .............................. 219/85.22; 219/85.18; 219/85.16; 219/85.11; 219/553
[58] Field of Search ................... 219/85.1, 85.18, 85.22, 219/535, 553, 209; 439/835; 29/860; 228/180.2

[56] References Cited

U.S. PATENT DOCUMENTS

| 2,759,161 | 8/1956 | Berg | 339/97 |
|---|---|---|---|
| 3,589,591 | 6/1971 | Schwenn | |
| 3,750,252 | 8/1973 | Landman | 29/191.6 |
| 3,820,055 | 6/1974 | Huffnagle et al. | |
| 4,788,404 | 11/1988 | Kent | 219/209 |

FOREIGN PATENT DOCUMENTS

| 0158434 | 10/1985 | European Pat. Off. |
| 0198697 | 10/1986 | European Pat. Off. |
| 0206620 | 12/1986 | European Pat. Off. |
| 0241597 | 10/1987 | European Pat. Off. |
| 0250094 | 12/1987 | European Pat. Off. |

OTHER PUBLICATIONS

Standard Search Report, 9/13/89.

*Primary Examiner*—Clifford C. Shaw
*Attorney, Agent, or Firm*—David L. Smith

[57] ABSTRACT

Simultaneous solder connections of multiple electrical terminals to respective electrical leads is achieved by conducting thermal energy from an actuable heater body (10,40,50,60,70) to the multiple connection sites via the terminals (20,21,45) themselves, the terminals being formed integrally with the heater body. The terminals are scored, perforated, etc., to facilitate severence from the heater body after soldering. The preferred heater body takes the form of a copper substrate (17,27,41,51,61) having a skin depth surface layer (19,29,43,53,63,65) of magnetically-permeable, high resistance alloy. Alternating current of constant amplitude and high frequency is passed through the heater body and concentrated in the surface layer at temperatures below the Curie temperature of the alloy. For higher temperatures the current is distributed through the lower resistance substrate to limit further heating. During the time interval required for the surface layer to reach its Curie temperature, the resistive power dissipation creates sufficient thermal energy to melt solder that is pre-deposited on the terminals and/or leads.

35 Claims, 5 Drawing Sheets

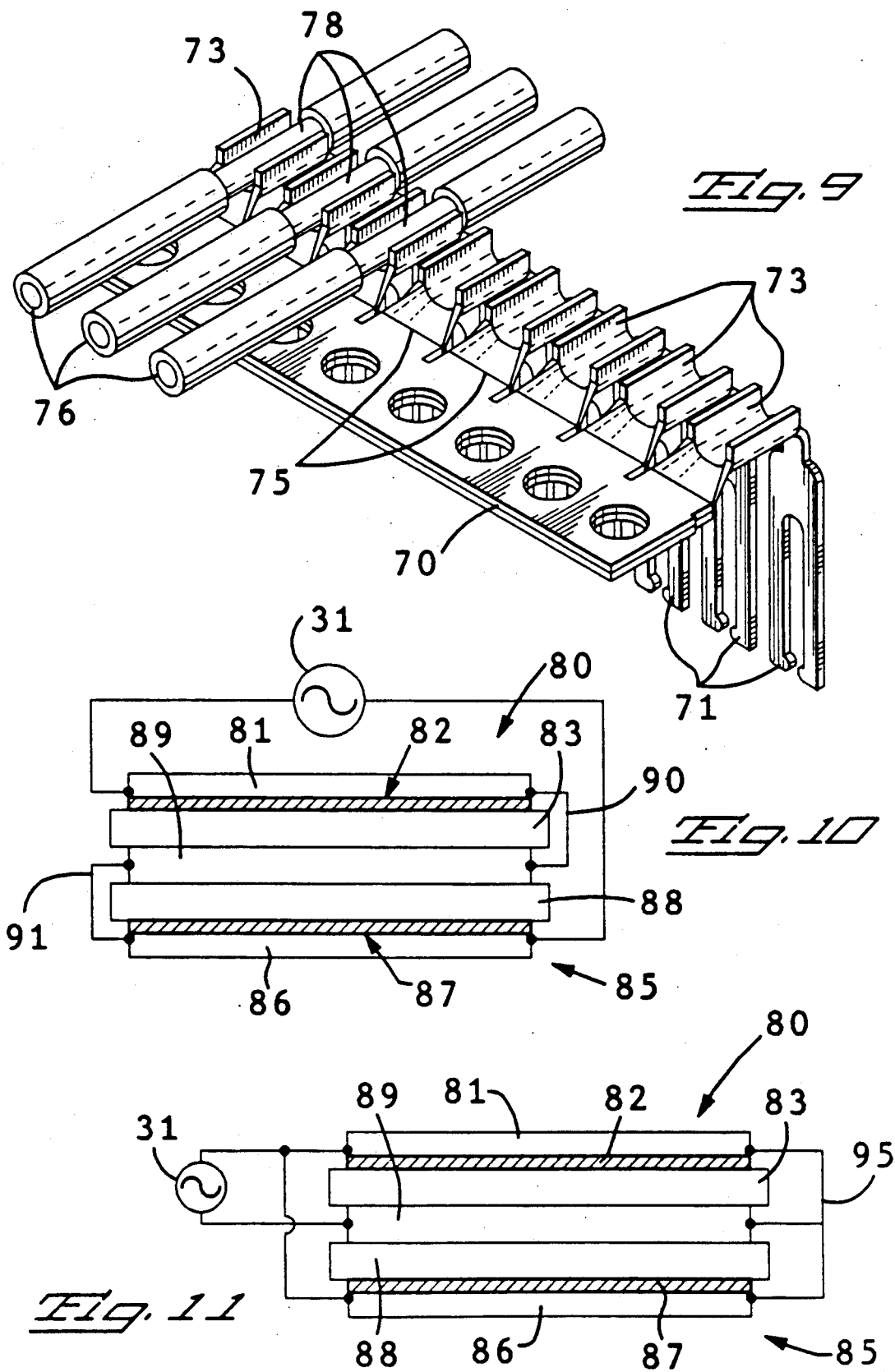

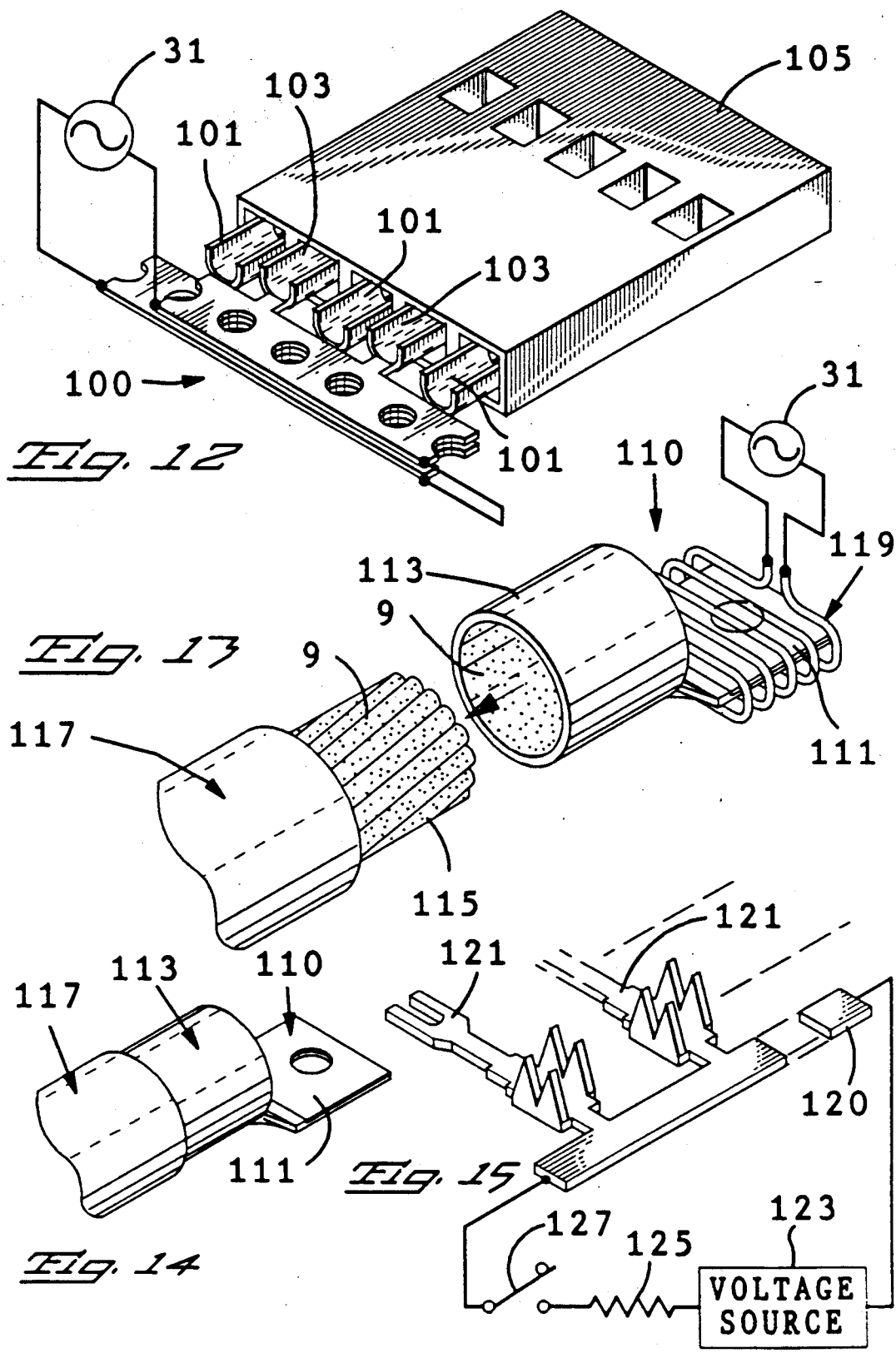

SELF REGULATING TEMPERATURE HEATER CARRIER STRIP

BACKGROUND OF THE INVENTION

The present invention relates to an improved method and apparatus for simultaneously terminating multiple electrical leads to multiple electrical terminals. Although the description set forth below mentions solder as the preferred fusible joining material, it is to be understood that any appropriate fusible material may be employed, such as doped plastic material.

It is known in the prior art to terminate the individual conductors in a ribbon cable (i.e., a cable having parallel conductors in a side-by-side orientation) by means of insulation displacement or piercing techniques such as described in U.S. Pat. No. 3,820,055. Such techniques have limitations in that they are relatively unreliable for stranded wires and for wires having a high current carrying capacity. Another known termination technique involves stripping the insulation from the individual conductors and crimping the conductors to respective terminals. However, this technique is quite time consuming and not suitable for conductors that are very closely spaced.

Soldering individual cable leads to respective terminals can be achieved by a variety of prior art methods and apparatus. The least desirable of these is manually soldering each terminal and lead because the resulting repetitive soldering operations are time consuming and costly. In addition, if a large number of leads from a common cable are to be soldered, great care must be taken to avoid inadvertent application of heat from the soldering tool to previously soldered components, resulting in the weakening or destruction of the solder connection.

Prior art soldering procedures for forming multiple solder joints simultaneously employ a soldering tool to deliver the necessary thermal energy over a large continuous area spanning all of the connection sites. Upon energization, the soldering tool heats up until it overshoots a control temperature (i.e., the temperature at which the solder material melts) before settling down to that temperature. The control temperature is typically chosen somewhat above the ideal soldering temperature in order to compensate for less than ideal thermal energy transfer. This approach to thermal energy delivery has a number of disadvantages. For example, the thermal energy applied to spaces between the connection sites is wasted. Another disadvantage is the likelihood of damage to components resulting from overheating. More specifically, the thermal overshoot inherent in the heating tool can damage components disposed between the connection sites within the area heated by the tool. In some cases the overshoot may cause damage to the components to be joined at the connection site. It is tempting to suggest that the operator of the soldering tool might avoid the thermal overshoot by either removing the tool before the overshoot occurs or delaying application of the tool until after the overshoot occurs. This is impractical for a number of reasons. First, there is no evident indication as to when the thermal overshoot occurs. Second, although the tool warm-up time is quite long, the time interval during which the tool temperature is sufficient to melt solder, but prior to overshoot, is too short to reliably complete the soldering operation. On the other hand, leaving the soldering tool energized at its steady state temperature becomes expensive and wasteful of energy. Where the soldering tool is also employed to apply pressure to the connection site, the power must be turned off after the solder melts and pressure is applied until the solder solidifies.

It is desirable, therefore, to provide a method and apparatus employing a wire termination technique that is more reliable than insulation displacement and less time consuming than individually crimp-terminating conductors to terminals. Such method and apparatus should permit simultaneous soldering of multiple terminals to multiple leads at respective connection sites without applying thermal energy to spaces between those sites. In addition, it is desirable that the thermal energy required to melt the solder be available virtually instantaneously after energization of the heater, and that the heater be arranged to provide no more thermal energy than is required to melt the solder employed for the various connection sites.

It is known in the prior art to provide a plurality of electrical terminals which are stamped and formed in a stamping press from a continuous strip of metal, with a portion of the metal strip remaining integral with each of the terminals to serve as a carrier strip along which the terminals are spaced. The integral carrier strip allows for conveyance of the terminals in sequential relationship through an insertion machine, typically having a severing station where terminals are removed from the strip, and an insertion station where the removed terminals are inserted into a printed circuit board, a connector housing, or other work piece in which the terminals are either mounted or contained. Once they are so inserted, the terminals are soldered to individual wires from cables, and the like. It is also known, as described in U.S. Pat. No. 4,021,095 (Kinkaid et al), to provide a plurality of carrier strips adapted to be stacked together immediately prior to being simultaneously conveyed to an insertion machine. The stacked carrier strips are mutually offset such that the terminals thereof are arranged with closer spacing than are the terminals along any one of the stacked carrier strips. The present invention makes advantageous use of this carrier strip concept of interdigitated terminals. The present invention also makes use of a relatively new automatic self-regulating heater technology disclosed in U.S. Pat. Nos. 4,256,945 (Carter et al), 4,623,401 (Derbyshire et al), 4,659,912 (Derbyshire), 4,695,713 (Krumme), 4,701,587 (Carter et al), 4,717,814 (Krumme) and 4,745,264 (Carter). The disclosures in these patents are expressly incorporated herein by reference. A heater constructed in accordance with this technology, hereinafter referred to as a self-regulating heater, employs a substrate of copper, copper alloy or other material of low electrical resistivity, negligible magnetic permeability and high thermal conductivity. A thin layer of thermally-conductive magnetic material is deposited on all or part of one surface of the substrate, the magnetic material typically being an iron, nickel or nickel-iron alloy, or the like, having a much higher electrical resistance and magnetic permeability than the substrate material. A constant amplitude, high frequency alternating current is passed through the heater and, as a result of the skin effect phenomena, is initially concentrated in the thin alloy layer. If the temperature of that layer reaches the Curie temperature of the alloy, the magnetic permeability of the layer decreases dramatically, thereby significantly increasing the skin depth so that the current density profile expands into the non-magnetic substrate of low resistivity. The overall result is a lower resistance and lesser heat dissipation. If thermal sinks or loads are placed in contact with the heater at different locations along the heater length, thermal energy is transferred to the loads at these locations with the result that the temperature does not rise to the alloy Curie temperature as quickly at those locations as it does in the non-load locations. The constant amplitude current remains concentrated in the higher resistance alloy layer at the load locations which dissipate considerably more resistive heating energy than is dissipated in the non-load locations where the current is distributed in the low resistance substrate.

SUMMARY OF THE INVENTION

In accordance with the present invention, a heater serves as a carrier strip for terminals to be soldered and is preferably, but not necessarily, a self-regulating heater. The carrier strip has a plurality of electrical terminals projecting therefrom in spaced relation. The terminals are in thermally-conductive contact with the heater body and each terminal has a prescribed area at which an electrical lead may be soldered to define a respective connection site. Thermal energy for melting solder is developed in the heater body and delivered directly to the connection site via the terminal. A prescribed amount of solder, as required for the particular connection, is deposited on the terminal or lead and is melted by the thermal energy conducted to all of the connection sites. After the soldering step, the terminals are severed from the heater and inserted in the appropriate workpiece. For some applications, such as where a plurality of ground wires are shorted together at a terminal block, the heater need not be removed from the terminals.

BRIEF DESCRIPTION OF THE DRAWINGS

Specific embodiments of the present invention are illustrated in the accompanying drawings wherein like reference numerals in the various Figures are utilized to designate like components, and wherein:

FIG. 9 is a view in perspective of a further embodiment of a self-regulating heater assembly in the form of a carrier strip constructed in accordance with the present invention;

FIG. 10 is a view in longitudinal section of still another embodiment of a self-regulating heater assembly in the form of a carrier strip constructed in accordance with the present invention;

FIG. 11 is a view in longitudinal section of an additional embodiment of a self-regulating heater assembly in the form of a carrier strip constructed in accordance with the present invention;

FIG. 12 is a view in perspective of the heater assembly of FIG. 1, for example, with its terminals partially received in a connector housing prior to a soldering operation;

FIG. 13 is a view in perspective of another self-regulating heater assembly having a single terminal constructed in accordance with the present invention;

FIG. 14 is a view of the terminal of FIG. 13 terminated to wire 117; and

FIG. 15 is a view in perspective of a further carrier strip/heater assembly embodiment of the present invention.

DESCRIPTION OF THE PREFERRED EMBODIMENTS

Figure 1:
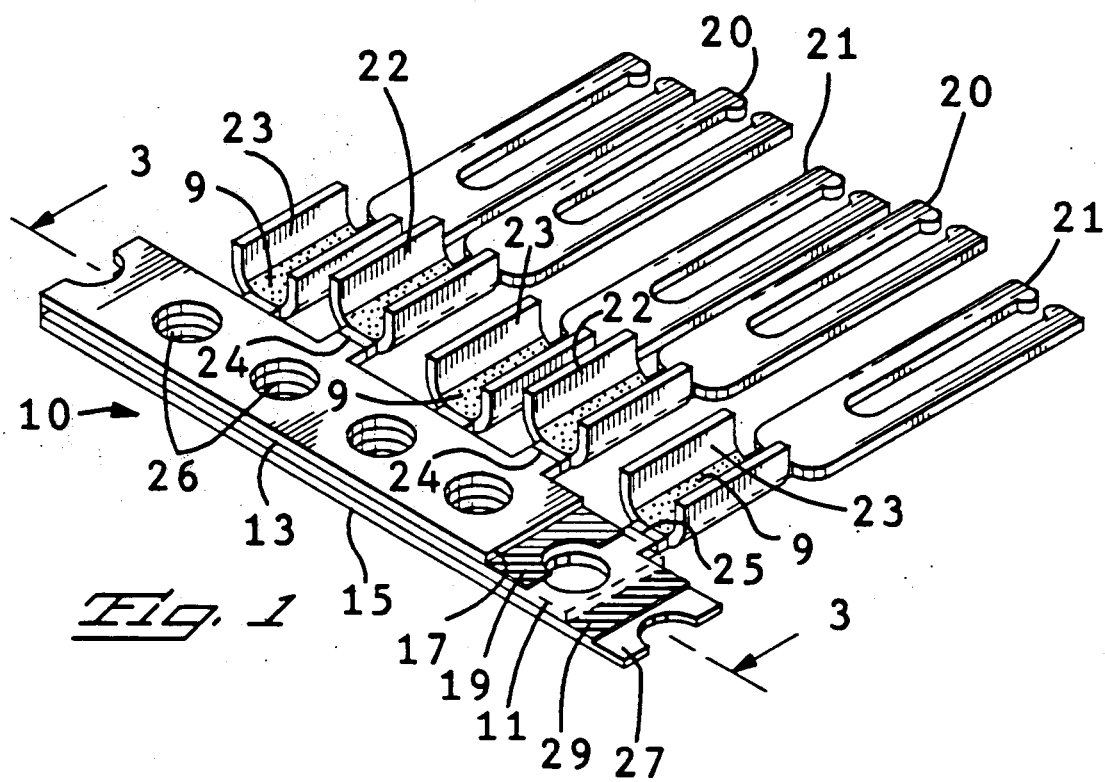
FIG. 1 is a view in perspective of a self-regulating heater assembly in the form of a carrier strip for electrical terminals constructed in accordance with the principles of the present invention.
Figure 2:
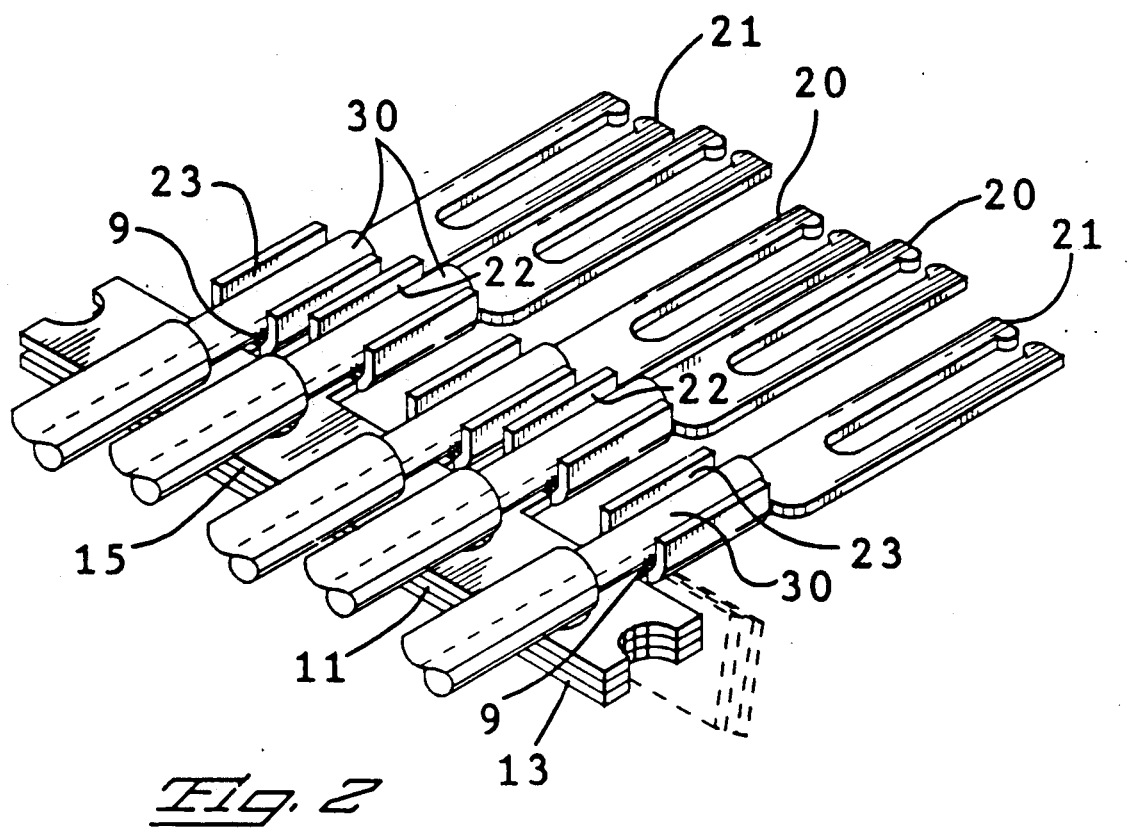
FIG. 2 is a view similar to that of FIG. 1 but in which electrical leads are positioned on respective terminals as part of a soldering operation according to the present invention.
Figure 3:
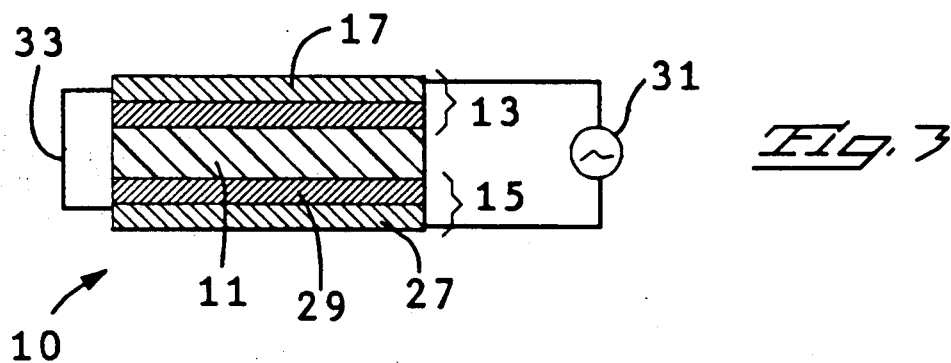
FIG. 3 is a view in longitudinal section of the heater assembly of FIG. 1 taken along lines 3—3 of FIG. 1.

Referring to FIGS. 1-3 of the accompanying drawings, a terminal carrier strip 10 is formed from two automatic self-regulating heater sections 13, 15 positioned on opposite sides of a strip 11 of insulation material such as Kapton. Heater section 13 includes an elongated rectangular substrate 17 of copper, copper alloy, phosphor bronze, beryllium copper, brass or other material having a high electrical conductivity (i.e., low resistivity) and negligible magnetic permeability (i.e., a permeability of, or close to, one).

The substrate material must also be a good thermal conductor. Substrate 17 typically, although not necessarily, has a length much greater than its width which, in turn, is much greater than its thickness. Typically, the length dimension is determined by a particular application whereby a very long strip is cut to length for that application. The width dimension of substrate 17 is generally the same as widths commonly employed for terminal carrier strips and may be on the order of one-tenth to one-quarter inch. Typically the thickness of the substrate is on the order of 0.008 inches. It should be noted that the rectangular substrate configuration illustrated in FIG. 1 is merely an exemplary configuration that is convenient for carrier strips, and that substantially any configuration, consistent with the principles described herein may be employed. For example, although the heater body utilized in the present invention is most conveniently configured as a carrier strip that can be rolled up on storage spools, or the like, the heart of the invention relates to a heater body having terminals secured thereto in thermally-conductive relation so that thermal energy for a soldering operation can be delivered directly to the connection site via the terminal itself. Considered in these broad terms, the overall structure of the heater sections and substrates can take substantially any configuration.

A layer 19 of magnetic material is deposited or otherwise disposed over one surface of substrate 17. Typically a roll cladding process is used where the magnetic material layer is laid over the substrate then subjected to high pressure and temperature which diffuses the two materials together at the boundary layer, but other processes such as plating or sputter depositing could be used. In the illustrated embodiment layer 19 is disposed over the entirety of the substrate surface facing insulation layer 11; however, as described below, the layer 19 having a typical thickness of 0.002 inch may be disposed only on selected surface portions. A typical material for layer 13 is nickel, iron, or a nickel-iron alloy, such as Alloy 42 (forty-two percent nickel, 58 percent iron), or Alloy 42-6 (forty-two percent nickel, six percent chromium, fifty-two percent iron); however, layer 19 may be any metal or alloy having the characteristics described herein. Depending upon the particular material, typical magnetic permeabilities for layer 19 range from fifty to more than one thousand, as compared to a permeability of one for copper. Electrical resistivities for layer 19 normally range from twenty to ninety microohms per centimeter as compared to 1.72 for copper. The thickness of layer 19 is typically one skin depth. In this regard, substrate 17 and layer 19, when energized by passing a constant amplitude alternating current therethrough, function as a self-regulating heater. Specifically, for temperatures below the Curie temperature of the material of layer 19, slightly more than sixty-three percent of the constant amplitude current flowing through the heater is concentrated in one skin depth from the heater surface. The skin depth is proportional to the square root of the material resistivity, and is inversely proportional to the square root of the product of the magnetic permeability of material 13 and the frequency of the alternating current passing through the heater. At temperatures equal to and above the Curie temperature of the layer 19 material, the magnetic permeability of the material drops to approximately that of the substrate material (i.e., a permeability of one, for copper), thereby producing a dramatic increase in the skin depth. Consequently, much more of the constant amplitude current is distributed in the lower resistivity substrate 17 than in the higher resistivity level 19, with the result that considerably less heat is dissipated. Importantly, if selected locations of the heater body are in contact with thermal energy absorptive loads (e.g., heat sinks), then the temperature at those locations of the heater body does not rise as readily as it does at the non-load locations. It is possible, therefore, for the constant amplitude current to be concentrated in layer 19 to a greater extent at the load locations (i.e., where the temperature is below the Curie temperature for layer 19) than at the non-load locations (i.e., where the temperature is equal to the Curie temperature of the material of layer 19). Curie temperatures for materials can range from 50 degrees C. to 1,000 degrees C.; typical materials employed for layer 19 have Curie temperatures in the range of 200 degrees C. to 500 degrees C., depending on the solder or other fusible material utilized. A typical solder is 63 percent tin with the balance being lead, having a melting point of 183 degrees C.

A plurality of electrical terminals 20 extend from a longitudinal edge of substrate 17 in spaced relation. In the embodiment illustrated in FIG. 1 there are two terminals 20 illustrated, it being understood that any number of these terminals may be provided, depending upon the chosen length of substrate 17 and the number of leads to be soldered to terminals. The distal end of each terminal 20 is configured as necessary to facilitate its insertion and connection within a workpiece, such as a printed circuit board, connector housing, or the like. Intermediate the proximal end and distal end of each terminal 20 there is a solder cup or well portion 22 configured to receive the tip of a wire to be soldered to the terminal. Each solder cup 22 is defined by a pair of opposed flanges extending transversely and upward from the plane of the terminal. Between the solder cup 22 and substrate 17, each terminal 20 includes a score or perforation line 24 which facilitates removal of the terminal from the substrate 17 after a soldering operation.

The second heater section 15 is substantially identical to heater section 13 and includes a substrate 27 with a magnetic skin layer 29. Substrate 27 is made of the same material as substrate 17 whereas layer 29 is the same material as that employed for layer 19. Operation of heater assembly 15 is substantially identical to the operation of heater assembly 13. Substrate 27 typically has the same dimensions as substrate 17 and is positioned, on the opposite side of insulation layer 11, with its longitudinal edges aligned with the longitudinal edges of substrate 17. The two surface layers 19 and 29 abut opposite surfaces of insulation layer 11.

A plurality of electrical terminals 21 extend from a longitudinal edge of substrate 27 in spaced relation. The edge of substrate 27 from which terminals 21 extend is aligned with the edge of substrate 17 from which terminals 20 extend, thereby positioning terminals 20 and terminals 21 along the same edge of the carrier strip assembly 10. The spacing between terminals 20 is substantially the same as the spacing between terminals 21, and is such that terminals 20 and 21 are interdigitated and the longitudinal spacing between terminals 20 and 21 is uniform along the length of strip 10. Each terminal 21 includes a solder well or cup 23 identical to solder wells 22 of terminals 20. In addition, score lines or perforations 25 are provided on terminals 21 to facilitate severability of the terminals from the carrier strip/heater assembly 10 after a soldering operation.

Each terminal 20, 21 is in thermally-conductive relation with its respective substrate 17, 27 so that the terminals may conduct thermal energy developed in the corresponding heater sections 13, 15 to a respective connection site where a soldering operation is to be performed. The terminals may be formed by stamping, or the like, as integral parts of their respective substrates 17, 27. As best illustrated in FIG. 1, the carrier strip assembly 10, which also serves as the heater, may be provided with a plurality of longitudinally spaced pilot holes 26 defined through its thickness dimension (i.e., through both heater sections 13 and 15 and through insulation layer 11) in order to facilitate handling of the strip during automated operations.

As best illustrated in FIG. 2, exposed conductor segments 30 of multiple electrical leads or wires may be disposed in the solder wells 22, 23 to define connection sites for a soldering operation. The exposed conductor segments 30 extend transversely of the longitudinal dimension of the carrier strip/heater assembly 10 and may have a predetermined amount of solder deposited thereon. Alternatively, the predetermined amount of solder 9 may be deposited in the solder wells 22, 23. As a further alternative, the required predetermined amount of deposited solder may be distributed between the wells 22, 23 and the exposed conductor portions 30 of the leads which may be part of a common cable or individual wires. After the exposed conductor portions 30 are placed in contact with the respective solder wells 22, 23, the heater assembly may be actuated in the manner described below. Referring to FIG. 3, a source 31 of constant amplitude alternating current is connected between heater section 13 and heater section 15 at one longitudinal end of assembly 10. Source 31 is selectively actuable and, although illustrated only schematically, is assumed to include a suitable impedance matching circuit designed to match the impedance of the heater assembly 10. Source 31 may be any suitable constant amplitude alternating current supply, and one exemplary source is disclosed in U.S. Pat. No. 4,626,767 (Clappier et al) which provides the required constant amplitude alternating signal in the radio frequency range. Most commonly, the frequency of the actuating signal is 13.56 MHz; the constant amplitude of the signal is selected to provide the desired heating level.

At a point along assembly 10 longitudinally remote from the connection source 31 there is a wire or other short circuit element 33 interconnecting the heater sections 13 and 15. Current flow through the assembly 10 therefore, at any instant of time, is in longitudinally opposite directions in heater section 13 and heater section 15. A resulting electric field is established between sections 13 and 15 across the insulation layer 11 by the oppositely-directed current to concentrate the current flow through assembly 10 in the high resistance surface layers 19 and 29 rather than in the low resistance outer surface of the substrates. Since the current amplitude is maintained constant, it is desirable, in order to effect optimal heating, to concentrate the current in the higher resistance layers 19, 29 of the heater assembly than in the low resistance substrates 17, 27. More particularly, the resistive heating, with the current maintained constant, is greater when the current path has greater resistance. The electrical field, developed by the oppositely-directed current flow in the two heater sections, assures that the current in the heater assembly is concentrated in the high resistance surface regions of the two heater sections.

The thermal energy resulting from the resistive heating is conducted to the various connection sites by the terminals 20, 21 themselves to melt solder that is deposited in predetermined amounts on the wire exposed conductor portions 30 or the terminal solder wells 22, 23. The amount of solder is predetermined in accordance with the amount necessary to effect a mechanically strong and electrically conductive solder connection at each connection site.

The carrier strip assembly 10 which also functions as a heater, may be broken away from the terminals 20, 21 after the solder solidifies. This break-away operation is effected by bending assembly 10 relative to terminals 20, 21 along the score or perforation lines 24, 25. Once the heater assembly 10 is removed from the terminals, the terminals are no longer structurally retained together but, instead, serve as terminations for the individual exposed conductor portions 30 of the wires or leads. It will be understood that for certain applications the heater body need not be severed from the terminals. One such application is where plural ground wires are to be shorted together at a terminal block.

Depending upon the nature of the insulation utilized on the wires or leads and the amount of thermal energy developed in assembly 10, it may be desirable to bend the assembly 10 relative to terminals 20, 21 along the score lines 24, 25 prior to energizing source 31 to effect a soldering operation. This bending, as illustrated in dashed lines in FIG. 2, permits the assembly 10 to be moved away from the insulated portions of the wires or leads to avoid heating the wires or leads other than through the solder wells.

The nature of the assembly 10 is such that the resistive heating is produced only where it is needed to effect soldering operations. More specifically, the current through assembly 10 flows longitudinally and thereby alternately encounters regions from which the terminals project and regions corresponding to spaces between the terminals. Thermal energy developed in regions proximate the terminals is conducted to respective connection sites by the terminals, thereby preventing the temperature at those regions from building up quickly. On the other hand, in the space regions the temperature increases rapidly until it reaches the Curie temperature of the material of layers 19, 29, whereupon the effective skin depth is increased dramatically in those regions. This causes more current to flow through the low resistance substrate material in these regions and, as a consequence, less thermal energy is produced therein. The regions proximate terminals 20, 21 continue to develop high amounts of thermal energy that is conducted to the respective connection sites. Overheating of the connection sites is prevented by the same mechanism; that is, once the temperature at the connection site reaches a certain level, thermal conduction from the heater to the site ceases, thereby removing the heat sink effect of the connection site. The thermal energy developed by the current flowing in high resistance layers 19, 29 then quickly increases the temperature proximate the terminals 20, 21 until the Curie temperature of the high resistance material is reached. At this point the effective skin depth along the entire length of the heater assembly is increased so that more of the constant amplitude current flows through the low resistance substrates 17, 27 and significantly less thermal energy is produced by resistive heating.

Figure 4:
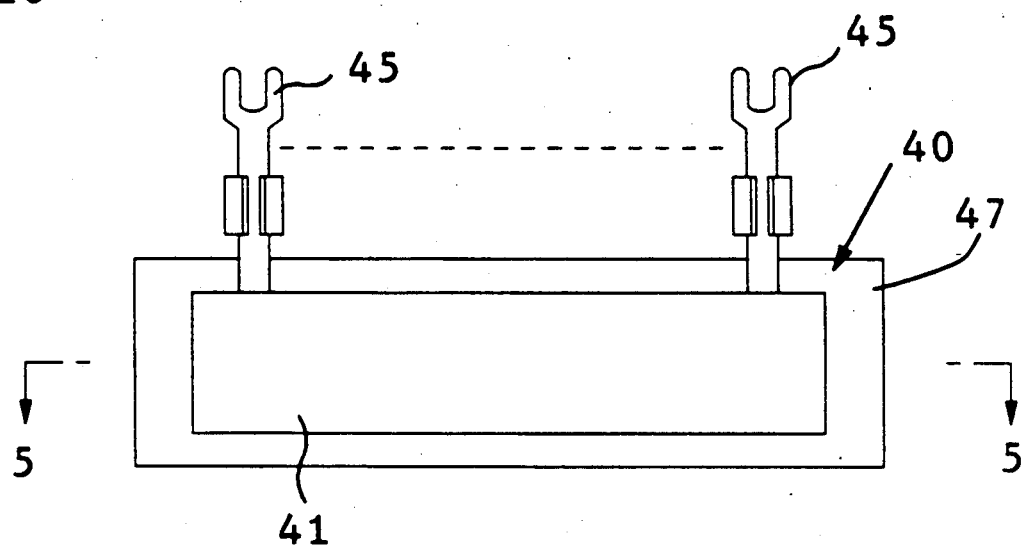
FIG. 4 is a top view in plan of another embodiment of a self-regulating heater assembly in the form of a carrier strip constructed in accordance with the present invention.
Figure 5:
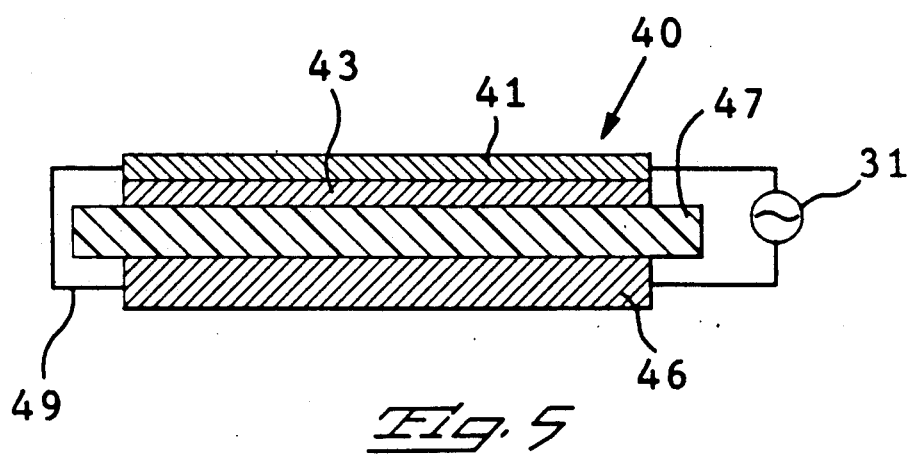
FIG. 5 is a view in longitudinal section taken along lines 5—5 of FIG. 4.

Another embodiment of the present invention is illustrated in FIGS. 4 and 5 to which specific reference is now made. In this embodiment the carrier strip serving as heater assembly 40 includes only a single heater section comprising low resistance substrate 41 and high resistance, magnetically permeable surface layer 43. Multiple terminals 45 project from one longitudinal edge of heater assembly 40 in spaced sequential relation. The dimensions of substrate 41 and surface layer 43, particularly the thickness dimensions, are similar to those described above in relation to FIG. 1. The current return path for heater assembly 40 is provided by a copper ground bus bar tooling member 46 disposed in flush abutting relation to one surface of an insulation layer 47 of material such as Kapton. The opposite surface of insulation layer 47 is placed in abutting relation to surface layer 43 of the heater assembly 40. Appropriate clamps, or the like, may be employed to hold bus member 46 and insulation layer 47 in place against assembly 40 for a soldering operation. The source 31 of constant amplitude alternating current is connected between one longitudinal end or point along assembly 40 and the corresponding end or point along tooling ground bus 46. A short circuit connection 49 is connected between the opposite longitudinal end or point along assembly 40 and the corresponding end or point along bus 46. The multiple terminals 45 are connected to respective multiple electrical leads in the same manner described above in relation to the embodiment of FIGS. 1-3. After soldering the terminals 45 are removed from heater assembly 40 along the appropriately provided score or perforation lines. It will be appreciated that the embodiment of FIGS. 4 and 5 utilizes only a single heater assembly 40 with a single row of terminals 45, whereas heater assembly 10 of FIG. 1 utilizes two heater sections, each having its own row of terminals, the two rows being interdigitated to optimize spacing between the terminals. In this regard, and as pointed out in the above-mentioned U.S. Pat. No. 4,021,095, the spacing between terminals on a single carrier strip depends upon the size and the complexity of the terminals stamped and formed from the continuous strip of metal. More particularly, as the three dimensional configuration of the terminal body becomes more complex, the amount of metal that must be consumed from the metal strip to form the terminal becomes greater. In turn, as the amount of metal consumed becomes greater, the terminals are required to be spaced further apart along the lengthwise dimension of the strip. Often, such spacing becomes excessive since substantial lost motion and assembly time results when the terminals must be individually indexed during automatic operations. The provision of two interdigitated rows of terminals 20, 21, such as with each row of terminals stamped at twice the desired contact spacing such that when interdigitated the terminals are on the desired contact spacing therefore (i.e., in the embodiment illustrated in FIG. 1) offers distinct advantages for certain applications over the embodiment utilizing only a single row of terminals (i.e., the embodiment illustrated in FIGS. 4 and 5).

It will also be appreciated that heater assembly 10, by utilizing two heater sections, has twice the heating capacity of assembly 40 utilized in connection with a low resistance return bus bar 46. Further, energization of assembly 10 is considerably simpler since there is no need to join separate tooling (e.g., elements 46, 47 of FIG. 5) to the heater; rather, assembly 10 is fabricated by the manufacturer in a manner such that each heater section 13, 15 serves as the current return path for the other.

Figure 6:
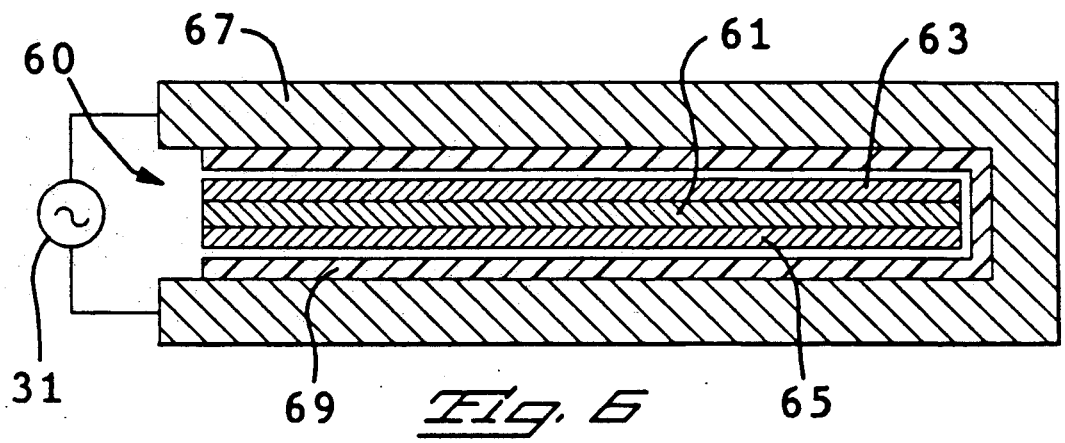
FIG. 6 is a view in longitudinal section of a further self-regulating heater assembly in the form of a carrier strip of the present invention.

The embodiment of the present invention illustrated in FIG. 6 of the accompanying drawings develops the current in a self-regulating heater by means of electromagnetic induction rather than direct conduction. The heater 60 takes the form of an elongated (i.e., in the horizontal dimension of the drawing) substrate 61 of copper or the like, the opposite surfaces of which are coated with respective skin layers 63, 65 of magnetic alloy or similar metal. Heater 60 has at least one row of terminals secured thereto (not visible in FIG. 6 but extending into the plane of the drawing) in the same manner that terminals 45 are secured to heater 40 (FIG. 4). The terminals are in thermally conductive relation with the heater. A tooling member for applying current to the heater 60 comprises a primary conductor 67 formed as an elongated strip of copper, or the like, bent in a U-shaped configuration. The inside surfaces of the conductor 67 have a strip 69 of electrically insulative material disposed thereon and extending over most of the length of the conductor. In use, heater 60 is disposed between the legs of the U-shaped primary conductor 67 and may either be spaced (as shown) by an air gap from the insulative strip 69 or may contact the insulative strip in flush abutting relation at each surface layer 63, 65. In either case, the heater 60 is typically held in place within primary conductor 67 by appropriate tooling attachments (not shown). For example, any suitable electrically-insulative bracket secured to strip 67 may be adapted to support heater 60 within the primary conductor confines.

In operation, a source 31 of constant amplitude alternating current is connected across the distal ends of the U-shaped primary conductor 67. That conductor functions as a primary winding of a transformer to induce currents in the heater strip 60 which serves as the secondary winding. The induced eddy currents, as is well known, tend to flow in planes perpendicular to the magnetic flux developed by the primary current. The flux produced by the alternating primary current in conductor 67 is directed perpendicular to the surfaces of heater 60; therefore, the induced eddy currents flow in planes parallel to the heater surface. The eddy currents are subject to the skin effect phenomena and, therefore, concentrate in the high-resistance skin surface layers 63 and 65 at temperatures below the Curie temperature of the skin layer material. The amplitude of the primary current is selected such that the resistive heating resulting from the eddy currents in the skin layers is sufficient to heat the terminals projecting from the heater 60 to the temperature required to melt solder deposited at the connection sites. After the soldering operation, the terminals may be severed from the heater assembly in the manner described above. Currents may also be electromagnetically induced in heater assembly 60 by means of a primary circuit comprising a number of turns of wire wrapped about the heater with insulation or an air gap interposed between the heater and the turns of wire. Electromagnetic induction of the heating current may also be effected by the transformer configuration described in U.S. Pat. No. 4,745,264 (Carter).

Figure 7:
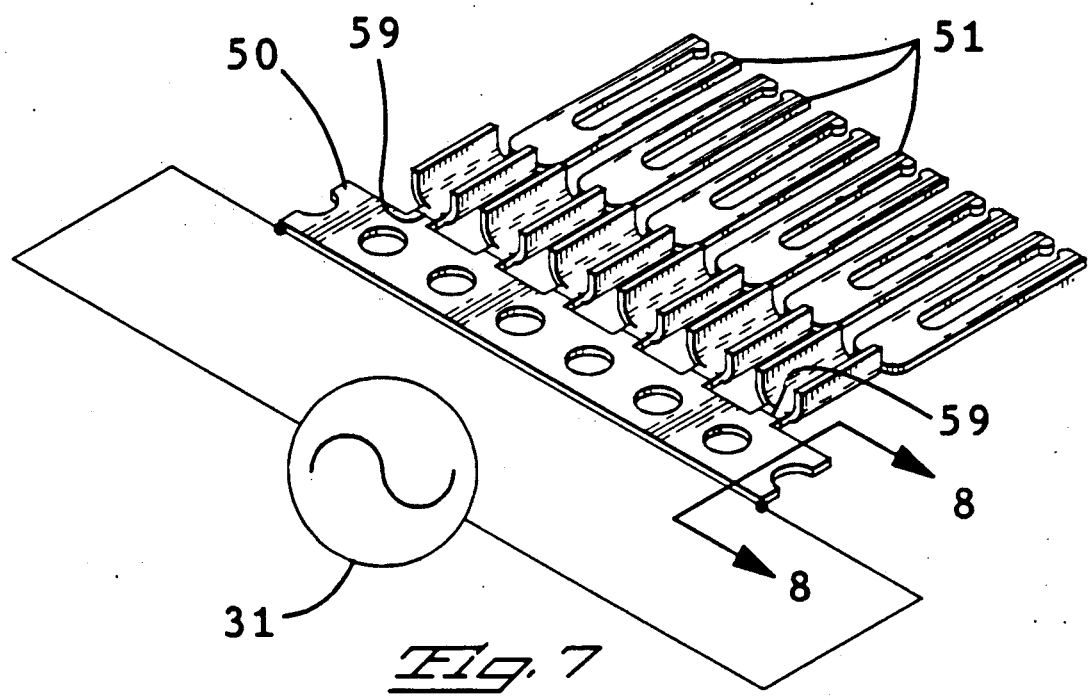
FIG. 7 is a view in perspective of yet another embodiment of a self-regulating heater in the form of a carrier strip constructed in accordance with the present invention.
Figure 8:
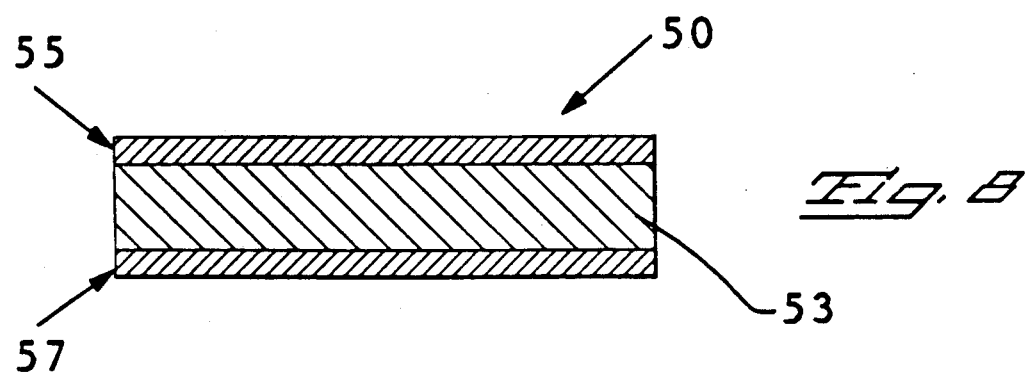
FIG. 8 is a view in transverse section taken along lines 8—8 of FIG. 7.

In FIGS. 7 and 8 there is illustrated a self-regulating heater assembly 50 in the form of a carrier strip from which a plurality of terminals 51 extend in spaced relation. The heater body 50 in this embodiment includes a single substrate 53 of copper or the like having magnetic skin layers 55 and 57 disposed on both of its opposite surfaces. Terminals 51 typically project from the substrate and are heated in the manner described above by passing a constant amplitude alternating current from source 31 connected across the length of the heater body. Connections to the heater body for the source may be at any of the three layers 53, 55 or 57. Terminals 51 are readily severable from heater assembly 50 along score lines 59 after a soldering operation is completed.

The use of two magnetic skin layers 55 and 57, rather than just one such layer, renders the self-regulating feature of the heater more effective. In particular, unless the current flow is otherwise constrained, the skin effect tends to concentrate the current at all of the surfaces of the substrate, not merely at the surface where the magnetic skin layer is disposed. Thus, if the magnetic material is deposited only on one surface of the substrate, the current flowing in the skin depth of lower resistance material at the other surfaces does not significantly contribute to the desired resistance heating and is, therefore substantially wasted. Moreover that current does not experience a current distribution change (i.e., an increase in skin depth) at the Curie temperature of the magnetic material and, therefore, does not contribute to temperature self-regulation. Likewise, if the substrate were to have a square transverse cross-section and two surfaces had a magnetic skin layer, the desired operation would not be efficiently attained. Ideally, therefore, all of the surfaces of the substrate should be coated with the magnetic skin layer to take maximum advantage of the thermal self-regulation phenomenon. As a practical matter, a substrate having a rectangular cross-section, and a width very much greater than its depth, serves effectively as a self-regulating heater when only the two larger surfaces are clad with the magnetic skin layer.

For example, substrate 53 would typically have a width that is at least fifty times greater than its depth or thickness. Of course, in applications where the current is substantially constrained to flow along one surface, as where an electric field is established between heater sections 13 and 15 (FIG. 3), efficient self-regulation is obtained when only that surface is clad with the magnetic skin layer.

In the embodiment illustrated in FIG. 2 the various wires to be soldered are shown with their exposed ends positioned in terminal solder wells. It is also possible to utilize the present invention to solder exposed intermediate portions of shielded wires to the terminals. An example of this is illustrated in FIG. 9 wherein self-regulating heater assembly 70, which may be any of the heater assemblies described herein, has multiple terminals 71 extending therefrom. Each terminal 71 includes a solder well portion 73 disposed between its proximal and distal ends and is bent at approximately a right angle at a location between its distal end and solder well 73. Score lines 75 at the proximal ends of the terminal facilitate terminal detachment from the heater body 70 after a soldering operation. The wires 76 to be soldered have their insulation stripped away at some wire portions 78 which, prior to a soldering operation, are placed in respective solder wells 73. When current is passed through the self-regulating heater assembly in the manner described above, solder that is pre-deposited in the solder well, or at exposed wire portions 78, melts and then solidifies after current flow is terminated. Connection of intermediate wire portions 78 permits different portions of the same wire to be soldered at different connection sites along the wire lengths. This type of connection is sometimes referred to as a "daisy chain."

Referring to FIG. 10, first and second self-regulating heater assemblies 80 and 85 are disposed on opposite sides of a bus bar 89. Heater assembly 80 includes a substrate 81 and magnetic skin layer 82. One or more terminals (not shown but similar to terminals 20 of FIG. 1) extend from the substrate and/or skin layer. Heater assembly 85 includes a substrate 86, magnetic skin layer 87 and one or more terminals interdigitated with the terminals of heater assembly 80. Skin layer 82 is disposed flush against one surface of insulative layer 83, the other surface of which abuts one surface of bus bar 89. Skin layer 87 is disposed flush against one surface of insulative layer 88, the other surface of which abuts a second surface of bus bar 89. To effect a soldering operation, a source 31 of constant amplitude alternating current is connected between opposite longitudinal ends of heater assemblies 80 and 85. A wire or other short circuit connection 90 is connected between the second end of heater assembly 80 and one end of bus bar 89; a second short circuit connection 91 is connected between the second end of heater assembly 85 and the second end of bus bar 89. The heater assemblies 80, 85 and bus bar 89 are thus connected in a series circuit across source 31. As a consequence of these connections the current passing through bus bar 89 at any instant of time is in a direction longitudinally opposite the direction of current flowing through each of the heater assemblies 80 and 85. Resulting electric fields are thereby established between bus bar 89 and each of respective heater assemblies 80, 85, thusly assuring that current flowing through the heater assemblies is concentrated in the proximate high resistance skin layers 82, 87, rather than flowing through the remote low resistance substrates 81, 86. As a consequence, considerably greater resistive heating is produced for the soldering operation.

The embodiment of FIG. 11 employs the same structure as the embodiment of FIG. 10 but the connections are such that heater assemblies 80, 85 are connected in parallel rather than in series. Specifically, one end of source 31 is connected to each of heater assemblies 80, 85 at one end of the unit. The other side of source 31 is connected to bus bar 89 at the same end of the unit. A jumper 95 connects the opposite ends of each of heaters 80, 85 to the opposite end of bus bar 89. As a consequence of these connections the current passing through bus bar 89 at any instant of time is in a direction longitudinally opposite the direction of current flowing through each of the heater assemblies 80 and 85. Resulting electric fields are thereby established between bus bar 89 and each of respective heater assemblies 80, 85, thusly assuring that current flowing through the heater assemblies is concentrated in the proximate high resistance skin layers 82, 87 rather than flowing through the remote low resistance substrates 81, 86.

The embodiment illustrated in FIG. 12 includes a heater assembly 100 of the same general type as assembly 10 described above in relation to FIG. 1 and includes plural spaced terminals 101 interdigitated with plural spaced terminals 103. The terminals are partially inserted into a connector housing 105. It is often conVenient for a connector manufacturer to sell connectors with individual terminals partially received and secured in respective contact-receiving passages of a connector housing. The terminals, which in the prior art are severed from their carrier strip in advance of delivery to the customer, are soldered by the customer to appropriate wires or leads and then pushed further into their respective passages to assume a final position therein. According to the present invention the connector may be sold with the interdigitated terminals 101, 103 partially inserted into respective passages of the housing 105 but with the carrier strip 100, serving as a heater assembly, still intact. The customer may then effect a soldering operation by connecting a source 31 across the two heater units in assembly 100 to simultaneously connect individual wires to the terminals. After the soldering operation the terminals are severed from the carrier strip along appropriate score lines, or the like, and then are fully inserted to their final positions in the housing passage. It will be appreciated that any of the heater assembly embodiments described herein may be utilized in connection with the particular end use described in relation to FIG. 12.

In the embodiment illustrated in FIG. 13 a heater body terminal 110 takes the form of a copper, copper alloy or the like tab 111 that is apertured or otherwise configured to permit it to be mechanically secured to a connector, terminal board, or other similar connective device. One or both surfaces of the tab is clad with a suitable above-described magnetic skin layer. An annular copper, copper alloy or the like sleeve 113 is integrally formed with tab 111 and sized to concentrically and snugly receive an insulation-stripped tip 115 of an electrical wire 117. Either the interior surface of sleeve 113 or the tip 115 of the wire, or both, have solder 9 pre-deposited thereon. The tab is surrounded with one or more turns of electrically-insulated wire forming a primary winding 119. To effect a soldering operation, alternating current at constant amplitude from source 31 is passed through the primary winding and induces eddy currents in the tab which thereby functions in response to the eddy currents as a self-regulating heater. The thermal energy developed by the eddy currents is conducted to sleeve 113 where it melts the pre-deposited solder to secure the sleeve to the Wire tip. Each tab-like heater is thus individually energized by its own primary winding and is removable from that winding after a soldering operation so that it may be secured to a terminal board, or the like, with its connected wire 117. Alternatively, the primary winding may be configured to remain a permanent part of the terminal and the resulting solder connection.

The heaters described above in relation to FIGS. 1-13 are all self-regulating heaters; that is, the heaters employ the combination of skin effect and Curie temperature to apply selectively localized and temperature-regulated heating. However, the present invention, in its broadest sense, permits utilization of any type of heater from which one or more terminals project in thermally-conductive relation. As an example of a more general type of heater so employed, reference is made to FIG. 14 of the accompanying drawings wherein a heater takes the form of a strip 120 of high resistance metal suitable for use as an electrical resistance heater without self-regulation. Multiple electric terminals 121 project from one or more edges of strip 120 in thermally-conductive relation therewith. A series circuit comprising a voltage source 123, a current-limiting resistor 125 and a selectively actuable switch 127 is connected across opposite ends of strip 120. When switch 127 is closed, current passes through the circuit, including the resistance heater strip 120, to develop thermal energy by means of resistive heating. The thermal energy is conducted by the terminals 121 to the appropriate connection sites where tips of wire leads are disposed so as to be soldered to the terminals 121. The arrangement illustrated in FIG. 14 is not as desirable as those described above in which a self-regulating heater is utilized to prevent overheating and to afford the desirable advantage of producing the required thermal energy at selected localized positions in the heater. Nevertheless, the illustrated resistance heater with no self-regulation may be employed in conjunction with the severable terminals that deliver thermal energy to various connection sites so that the terminals may be soldered directly to leads disposed at those sites.

It will be appreciated that the rectangular strip configuration illustrated herein for the various heater assemblies is particularly useful when the heater assembly serves as a carrier strip for the various terminals projecting therefrom. It must be noted, however, that the invention described herein is somewhat broader in concept in that the heater assembly from which the terminals project need not serve as a carrier strip. In this regard, the heater assembly may take substantially any shape and form and may comprise substantially any type of heater consistent with the principles described herein. Likewise, although each of the embodiments includes terminals extending from a common edge of a heater assembly, it will be understood that the terminals can extend in a variety of different directions from the heater and may include a variety of shapes, sizes, bends and the like; the important feature for each configuration is that the terminals are in thermally-conductive relation to the heater body.

As previously noted, although the description set forth herein relates to pre-deposition of solder on the wire or the terminals, materials other than solder may be employed. For example, several conductive adhesives and pastes are commercially available and are fabricated as suspensions of metal powder in a thermosetting plastic. The metal powders employed are typically silver, gold, copper and aluminum while the adhesive plastic is generally an epoxy-type resin. Fusion temperatures and characteristics for these materials are well known.

It will be understood by those skilled in the art that, for applications in which solder is utilized as the fusible material, it is normally necessary to employ an appropriate flux material for the purposes of wetting and cleansing the contacts. In employing the present invention the flux may be part of a mixture of solder and flux that is pre-deposited on the terminals or wires; or the flux may be applied separately at the time of soldering; or the solder-flux mixture, in the form of conventional creams, pastes or liquids, may be applied to the connection site at the time of soldering.

From the foregoing description it will be appreciated that the invention makes available a novel method and apparatus for effecting multiple soldering connections simultaneously between multiple terminals and multiple electrical leads, wherein electrically and thermally conductive terminals deliver thermal energy from a heater body to the connection site and then are severable from the heater body to remain a permanent part of each soldered connection. Having described preferred embodiments of a new and improved method and apparatus for simultaneously soldering multiple electrical terminals to multiple electrical leads, it is believed that other modifications, variations and changes will be suggested to those skilled in the art in view of the teachings set forth herein. It is therefore to be understood that all such variations, modifications and changes are believed to fall within the scope of the present invention as defined by the appended claims.

We claim:

1. A soldering apparatus for simultaneously terminating a plurality of electrical leads to a respective plurality of electrical terminals at respective plural connection sites by providing sufficient energy to melt a predetermined amount of fusible electrically conductive material at each of said connection sites, said apparatus comprising:

a selectively actuable heater body for supplying at least said sufficient thermal energy, wherein said plurality of electrical terminals are structurally part of, and in thermally-conductive relation with, said heater body and each of said terminals includes a transversely-extending portion of reduced thickness to facilitate severing of the terminal;

wherein each of said electrical terminals includes a prescribed section at which a respective lead from said plurality of electrical leads is disposed prior to actuating said heater body to define said connection sites; and wherein, each of said terminals includes a respective thermal energy conduction path from said heater body to a respective connection site.

2. A soldering apparatus for simultaneously terminating a plurality of electrical leads to a respective plurality of electrical terminals at respective plural connection sites by providing sufficient energy to melt a predetermined amount of fusible electrically conductive material at each of said connection sites, said apparatus comprising:

a selectively actuable heater body for supplying at least said sufficient thermal energy, said heater body comprising a substrate of an electrically-conductive first material having a relatively low electrical resistivity and relatively low magnetic permeability, said substrate having a first surface, and a thin surface layer of an electrically-conducive second material disposed on at least a portion of said first surface, said second material having a higher electrical resistivity than that of the first material and having a magnetic permeability which, at temperatures below it Curie temperature, is substantially the same as said relatively low magnetic permeability and, at temperatures above its Curie temperature is substantially the same as said relatively low magnetic permeability;

each of said electrical terminals structurally part of and in conductive relation with said heater body, said electrical terminals projecting from locations of said heater body proximate said portion of said first surface, each of said electrical terminals including a transversely-extending portion of reduced thickness to facilitate severing of the terminal from said heater body, said transversely-extending portions being co-linearly aligned, whereby each of said electrical terminals includes a prescribed section at which a respective lead from said plurality of electrical leads is disposed prior to actuating said heater body to define said connection sites, and whereby each of said terminals includes a respective thermal energy conduction path from said heater body to a respective connection site.

3. A soldering apparatus for simultaneously terminating a plurality of electrical leads to a respective plurality of electrical terminals at respective plural connection sites by providing sufficient energy to melt a predetermined amount of fusible electrically conductive material at each of said connection sites, said apparatus comprising:

a selectively actuable heater body for supplying at least said sufficient thermal energy, said heater body comprising a substrate of an electrically-conductive first material having a relatively low electrical resistivity and relatively low magnetic permeability, said substrate having a first surface, and a thin surface layer of an electrically-conducive second material disposed on at least a portion of said first surface, said second material having a higher electrical resistivity than that of the first material and having a magnetic permeability which, at temperatures below its Curie temperature, is substantially greater than said relatively low magnetic permeability and, at temperatures above its Curie temperature, is substantially the same as said relatively low magnetic permeability;

each of said electrical terminals structurally part of and in conductive relation with said heater body, said electrical terminals projecting from locations of said heater body proximate said portion of said first surface, each of said electrical terminals including a transversely-extending perforated portion to facilitate severing of the terminal from said heater body, whereby each of said electrical terminals includes a prescribed section at which a respective lead from said plurality of electrical leads is disposed prior to actuating said heater body to define said connection sites, and whereby each of said terminals includes a respective thermal energy conduction path from said heater body to a respective connection site.

4. A method for simultaneously providing connections, at a plurality of connection sites, between a respective plurality of electrical terminals and a respective plurality of electric leads wherein each of said terminals project from and is in thermally-conductive contact with a heater body which includes a first self-regulating heater comprising a substrate of an electrically-conductive first material having relatively low electrical resistivity and magnetic permeability, and a thin surface layer of a second material having a very much higher magnetic permeability at temperatures below its Curie temperature and a greater electrical resistivity than that of said first material, said method comprising the steps of:

simultaneously at each connection site, disposing a respective electrical lead against a predetermined section of a respective terminal wherein each of said terminals projects from and is in thermally-conductive contact with a selectively actuable heater body;

delivering thermal energy simultaneously to each of said connection sites via respective terminals to melt a fusible electrically conductive material at each connection site by passing an alternating current of fixed amplitude through said heater body such that:
(a) for heater body temperatures below the Curie temperature of said second material, the current is substantially concentrated in said layer of said second material; and
(b) for heater body temperatures above said Curie temperature, the current is distributed to a substantially greater extent in said substrate; and severing said terminals from said heater body after the melted fusible material has solidified at said connection sites.

5. The method according to claim 4 wherein the step of severing includes breaking said terminals away from said heater body along a pre-formed portion of each terminal having sufficiently lower structural strength than the remainder of that terminal.

6. The method according to claim 4 wherein the step of severing includes tearing the terminals away from the heater body along a pre-formed perforation in each terminal 7. The method according to claim 4 wherein the step of passing -an alternating current includes establishing an electrical field in a direction transverse to current flow through said heater body to concentrate the current in said thin layer for heater body temperatures below the Curie temperature of said second material.

8. The method according to claim 4 wherein the step of passing an alternating current includes electromagnetically inducing the alternating current in said heat body.

9. The method according to claim 4 wherein said heater body includes a second self-regulating heater and a return bus, said first and second self-regulating heaters being disposed in electrically-insulated adjacency to said return bus with the skin layers of the respective heaters facing the return bus, and wherein said step of actuating said heater body comprises passing said alternating current through said first and second self-regulating heaters and said return bus in series such that current flow through said return bus at any instant of time is in a direction opposite current flow through each of said first and second self-regulating heaters, whereby electric fields are established between said return bus and each of said self-regulating heaters to concentrate current through said self-regulating heaters in said skin layers.

10. The method according to claim 4 wherein said heater body includes a second self-regulating heater and a return bus, said first and second self-regulating heaters being disposed in electrically-insulated adjacency to said return bus with the skin layers of the respective heaters facing the return bus, and wherein said step of actuating said heater body comprises passing said alternating current through said first and second self-regulating heaters in parallel and then through said return bus such that in series such that current flow through said return bus at any instant of time is in a direction opposite current flow through each of said first and second self-regulating heaters, whereby electric fields are established between said return bus and each of said self-regulating heaters to concentrate current through said self-regulating heaters in said skin layers.

11. The method according to claim 4 wherein said terminals are adapted to be inserted in respective terminal-receiving passages in a connector housing, said method further comprising the steps of:
partially inserting each of said terminals in its respective terminal-receiving passage in said connector housing prior to actuating said heater body; and
fully inserting said electrical terminals into their final positions in said respective terminal-receiving passages after electrical connections have been made between the terminals and the electrical leads.

12. A soldering apparatus for simultaneously terminating a plurality of electrical leads to a respective plurality of electrical terminals at respective plural connection sites by providing sufficient energy to melt a predetermined amount of fusible electrically conductive material at each of said connection sites, said apparatus comprising:
a selectively actuable heater body comprising a carrier strip having a plurality of stamped and formed electrical terminals extending therefrom for supplying at least said sufficient thermal energy and each of said terminals includes a transversely-extending portion of reduced thickness to facilitate severing of the terminal;
wherein each of said electrical terminals includes a prescribed section at which a respective lead from said plurality of electrical leads is disposed prior to actuating said heater body to define said connection sites; and
wherein, each of said terminals includes a respective thermal energy conduction path from said heater body to a respective connection site.

13. A soldering apparatus for simultaneously terminating a plurality of electrical leads to a respective plurality of electrical terminals at respective plural connection sites by providing sufficient energy to melt a predetermined amount of fusible electrically conductive material at each of said connection sites, said apparatus comprising:
a selectively actuable heater body comprising a carrier strip having a plurality of stamped and formed electrical terminals extending therefrom for supplying at least said sufficient thermal energy, a substrate of an electrically-conductive first material having a relatively low electrical resistivity and relatively low magnetic permeability, said substrate having a first surface, and a thin surface layer of an electrically-conductive second material disposed on at least a portion of said first surface, said second material having a higher electrical resistivity than that of the first material and having a magnetic permeability which, at temperatures below its Curie temperature, is substantially greater than said relatively low magnetic permeability and, at temperatures above its Curie temperature, is substantially the same as said relatively low magnetic permeability,
wherein each of said electrical terminals includes a prescribed section at which a respective lead from said plurality of electrical leads is disposed prior to actuating said heater body to define said connection sites; and
wherein, each of said terminals includes a respective thermal energy conduction path from said heater body to a respective connection site.

14. The apparatus according to claim 13 wherein each of said terminals has said predetermined amount of said fusible electrically conductive material deposited thereon.

15. The apparatus according to claim 13 wherein each of said electrical leads has said predetermined amount of fusible electrically conductive material deposited thereon.

16. The apparatus according to claim 13 wherein said predetermined amount of fusible material at each connection site is deposited on the electrical lead and the electrical terminal at that connection site.

17. The apparatus according to claim 13 wherein each of said electrical terminals includes a distal end remote from said heater body, and wherein each of said terminals includes a bend of approximately a right angle at a location between said prescribed section and said distal end.

18. The apparatus according to claim 13 further comprising energizing means for selectively passing alternating current through said heater body and said current return path at a substantially fixed amplitude sufficient to heat said surface layer of second material to its Curie temperature within a prescribed time interval and at a frequency such that the current in the region of said portion of said first surface is concentrated in said surface layer.

19. The apparatus according to claim 18 wherein said energizing means includes a current return path and source means, and wherein current return path includes a return bus and electrically-conductive means connecting said heater body to said bus, said apparatus further comprising a layer of electrically-insulative material disposed between and in flush abutting contact with said surface layer and said bus.

20. The apparatus according to claim 19 wherein return bus is an integral portion of said substrate folded over onto, said layer of electrically conductive material.

21. The apparatus according to claim 13 wherein said electrical terminals project from locations of said heater body proximate said portion of said first surface.

22. The apparatus according to claim 21 wherein said electrical terminals each include a transversely-extending portion of reduced thickness to facilitate severing of the terminal from said heater body, said transversely-extending portions being co-linearly aligned.

23. The apparatus according to claim 21 wherein said electrical terminals each include a transversely-extending perforated portion to facilitate severing of the terminal from said heater body.

24. The apparatus according to claim 13 wherein said first material comprises copper.

25. The apparatus according to claim 13 wherein said second material comprises iron.

26. The apparatus according to claim 25 further comprising:
a second heater body comprising:
a second substrate of said electrically-conductive first material, said second substrate having a first surface;
a second thin surface layer of said second material disposed on at least a first portion of the first surface of said second substrate; and electrically-conductive means connecting said first and second heater bodies in series and in series with said return bus;
said apparatus further comprising a second layer of electrically-insulative material disposed between and in flush abutting contact with said second surface layers and said return bus;
wherein said first and second heater bodies are oriented relative to said return bus such that current flow through said heater bodies at any instant of time is oppositely directed to current flow through said return bus whereby electric fields are established between said return bus and each of said heater bodies to concentrate current flow through said heater bodies in said thin surface layers.

27. The apparatus according to claim 25 further comprising:
a second heater body comprising:
a second substrate of said electrically conductive first material, said second substrate having a first surface;
a second thin surface layer of said second material disposed on at least a first portion of the first surface of said second substrate; and
electrically-conductive means connecting said first and second heater bodies in a parallel circuit and connecting the parallel circuit in series with said return bus;
said apparatus further comprising a second layer of electrically-insulative material disposed between and in flush abutting contact with said second surface layers and said return bus;
wherein said first and second heater bodies are oriented relative to said return bus such that current flow through said heater bodies at any instant of time is oppositely directed to current flow through said return bus whereby electric fields are established between said return bus and each of said heater bodies to concentrate current flow through said heater bodies in said thin surface layers.

28. The apparatus according to claim 13 wherein said second material comprises nickel.

29. The apparatus according to claim 13 wherein said current return path includes: a second heater body comprising:
a second substrate of said electrically-conductive first material, said second substrate having a first surface;
a second thin surface layer of said second material disposed on at least a first portion of the first surface of said second substrate; and
electrically-conductive means connecting said first and second heater bodies in series;
said apparatus further comprising a second layer of electrically-insulative material disposed between and in flush abutting contact with said second surface layers.

30. The apparatus according to claim 13 further comprising:
a connector housing having a plurality of terminal-receiving passages adapted to receive said electrical terminals in fully inserted operational positions;
wherein each of said plurality of electrical terminals is initially disposed partially within a respective passage in said plurality of terminal-receiving passages prior to actuation of said heater body.

31. The apparatus according to claim 13 wherein each of said electrical terminals includes a distal end remote from said heater body, and wherein each of said terminals includes a bend of approximately a right angle at a location between said prescribed section and said distal end.

32. The apparatus according to claim 13 wherein said substrate includes a second surface facing oppositely of said first surface; and
wherein said heater body further includes a second thin surface layer of said second material disposed on at least a portion of said second surface.

33. The apparatus according to claim 13 wherein said apparatus further comprises:
means for electromagnetically inducing alternating current flow through said heater body at a substantially fixed amplitude sufficient to heat said first surface layer to its Curie temperature within a prescribed time interval and at a frequency such that the current in the region of said portion of said first surface is concentrated in said first surface layer.

34. The apparatus according to claim 33 wherein said substrate includes a second surface facing oppositely of said first surface;
wherein said heater body further includes a second thin surface layer of said second material disposed on at least a portion of said second surface;
wherein said means for electromagnetically inducing includes means for inducing said alternating current flow such that the current is concentrated in both said first and second surface layers for temperatures of said second material below said Curie temperature.

35. A method for simultaneously providing connections, at a plurality of connection sites, between a respective plurality of electrical terminals and a respective plurality of electric leads wherein each of said terminals project from and is in thermally-conductive contact with a heater body which includes a first self-regulating heater comprising a substrate of an electrically-conductive first material having relatively low electrical resistivity and magnetic permeability, and a thin surface layer of a second material having a very much higher magnetic permeability at temperatures below its Curie temperature and a greater electrical resistivity than that of said first material, said method comprising the steps of:
simultaneously at each connection site, disposing a respective electrical lead against a predetermined section of a respective terminal wherein each of said terminals projects from and is in thermally-conductive contact with a selectively actuable heater body; and delivering thermal energy simultaneously to each of said connection sites via respective terminals to melt a fusible electrically conductive material at each connection site by passing an alternating current of fixed amplitude through said heater body such that:

(a) for heater body temperatures below the Curie temperature of said second material, the current is substantially concentrated in said layer of said second material; and (b) for heater body temperatures above said Curie temperature, the current is distributed to a substantially greater extent in said substrate.

* * * * *

UNITED STATES PATENT AND TRADEMARK OFFICE
CERTIFICATE OF CORRECTION

PATENT NO. : 5,032,703

DATED : July 16, 1991

INVENTOR(S) : Henschen et al

It is certified that error appears in the above-identified patent and that said Letters Patent is hereby corrected as shown below:

In Claim 2, Column 15, Line 7, delete "conducive" and insert --conductive--; in Line 12, delete "it" and insert --its--; in Line 13, delete "the same as" and insert --greater than--; and in Line 15, insert --,-- after "temperature".

In Claim 3, Column 15, Line 47, delete "conducive" and insert --conductive--.

In Claim 7, Column 16, Line 51, delete "-an" and insert --an--.

In Claim 20, Column 18, Line 60, delete "," after "onto".

UNITED STATES PATENT AND TRADEMARK OFFICE
CERTIFICATE OF CORRECTION

PATENT NO. : 5,032,703

DATED : July 16, 1991

INVENTOR(S) : Henschen et al

It is certified that error appears in the above-identified patent and that said Letters Patent is hereby corrected as shown below:

In column 22, line 8, please insert claim 36 as follows:

--36. The method according to claim 35 wherein the step of passing an alternating current includes electromagnetically inducing the alternating current in said heater body.--.

Signed and Sealed this

Twentieth Day of October, 1992

Attest:

DOUGLAS B. COMER

*Attesting Officer*  *Acting Commissioner of Patents and Trademarks*